Patented Mar. 6, 1923.

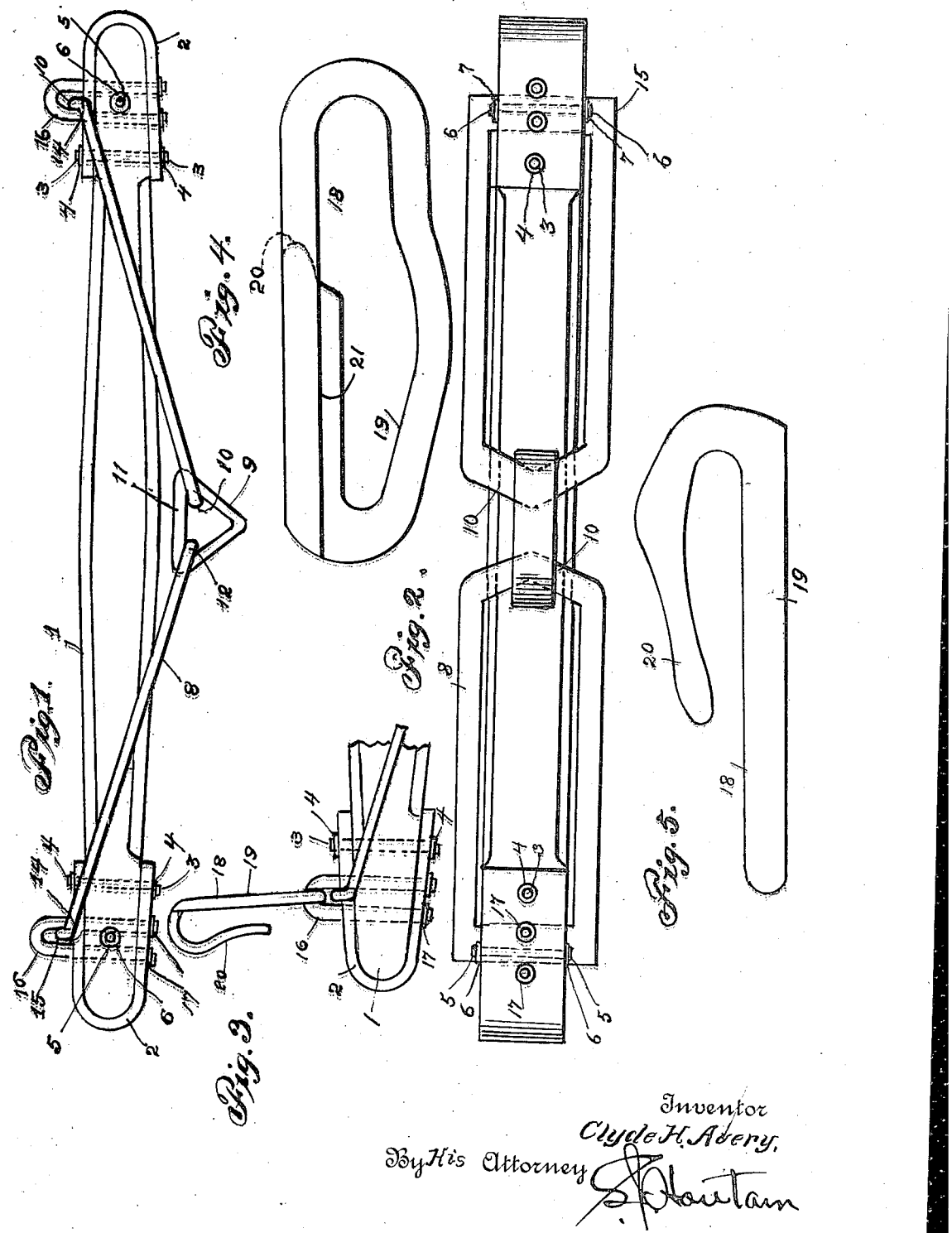

1,447,404

UNITED STATES PATENT OFFICE.

CLYDE H. AVERY, OF BOSTON, MASSACHUSETTS.

SINGLETREE.

Application filed January 6, 1921. Serial No. 435,458.

*To all whom it may concern:*

Be it known that I, CLYDE H. AVERY, a citizen of the United States, and resident of Boston, in the county of Suffolk and State of Massachusetts, have invented certain new and useful Improvements in Singletrees, of which the following is a specification.

The present invention relates to singletrees for attachment to vehicles, plows or the like, more particularly horse drawn traction devices of heavy construction.

The invention has for an object the provision of an article of this character which is adapted to withstand a maximum draft without liability of straining or fracturing its wooden cross bar; further objects being to provide efficient means for reinforcing the cross bar embodying simple and durable parts assembled in such novel correlation as to produce a structure which is not only very durable but of simple and inexpensive construction.

In carrying out my invention I employ a truss comprising two elongated links of malleable metal which engage around and over the front, top and bottom of the ends of a wooden cross bar and extend at angles which converge rearwardly of the cross bar, and are connected by a triangular coupling-link, adapted for attachment to a vehicle, plow or the like, means for fixing said truss to said bar and hook means for engaging the traces of a horse's harness, and means for reinforcing the ends of the cross bar and other novel features, all as hereinafter fully described and specifically set forth in the annexed claims.

In the accompanying drawings forming part of this specification, Figure 1 is a plan view illustrating my improvements. Fig. 2 is a rear side view. Fig. 3 is a top view of one end of the cross bar. Fig. 4 is a side view of a hook, drawn on an enlarged scale, for connection with a trace; and Fig. 5 is a top view thereof.

In the embodiment of my invention illustrated by the drawings, 1 indicates a wooden cross bar which is reinforced at its respective ends by means of a close fitting bent metal binding plate or strip 2 which is securely fixed by means of a riveted bolt 3 and washers 4. The cross bar 1, is further strengthened at its respective end parts by a riveted bolt and washers 6.

Embracing and extended over the top and bottom of the cross bar 1 is a truss or brace of novel construction comprising elongated metal link-members 7 and 8. These members extend obliquely across and around the bar 1, at angles which converge at a point rearwardly of the cross bar 1, and they are linked together at their adjacent inner ends by means of a triangular coupling-link 9, the inner end of each link-member 7, 8, having an angular bend 10, for engagement with the oppositely located bends 11 and 12, of the triangular link 9; the bend 13 of said link adapted for engaging a draft hook of a plow or other means for connection with a traction device.

The outer end of each link member 7 and 8 is formed with a lateral bend 14 and a vertical part 15, which bears against the front surface of the plate 2, and they are respectively fixed to the cross bar 1, by means of a staple 16, which extends through said bar 1 and is riveted to the rear surface of the plate 2, the ends of the staple being riveted over washers 17.

The looped parts of the staples 16 are in linked engagement with trace hooks 18, which respectively embody an elongated eye 19 and a bill 20 for engaging the traces of a horse's harness. These hooks are preferably composed of a single piece of wrought metal bent into shape and welded as indicated by the line 21, Fig. 4 of the drawings. The elongated links 7, 8 and the triangular link 9 are also respectively composed of a single piece of wrought metal having a welded joint, thus providing an exceedingly strong and durable singletree.

It is manifest that in employing my improved singletree the draft is sustained by the linked truss, the wooden cross bar acting only as a strut or spacing and supporting means for the truss; and owing to the fact that the cross bar requires no central piercing and has no direct connection with the vehicle it is not subject to strain or injury by inequalities of draft.

I do not wish to be understood as confining myself to the specific details of mechanical construction and contour of the parts as herein shown and described, as I believe that I am entitled to employ slight variations and equivalents.

Having thus described my invention, what I claim as new and desire to secure by Letters Patent, is:

1. The combination with a wooden singletree having metal-bound ends, of a truss consisting of a pair of elongated links whose respective outer ends extend on a straight vertical line and whose inner ends are V-shaped, and a triangular link connecting said inner ends, and transversely extended staples straddling said outer ends and coincidentally carrying singletree hooks.

2. The combination with a wooden singletree having metal-bound ends, of a truss consisting of a pair of elongated links whose respective outer ends extend on a straight vertical line and whose inner ends are V-shaped, said links extended obliquely on lines which converge centrally at the back of the singletree, and a triangular link connecting said V-shaped ends, and transversely extended staples straddling said outer ends and coincidentally carrying singletree hooks.

Signed at office of notary public in the county of Suffolk and State of Massachusetts this 7th day of Aug. A. D. 1920.

CLYDE H. AVERY.